(12) United States Patent
Hattori

(10) Patent No.: US 6,414,812 B1
(45) Date of Patent: Jul. 2, 2002

(54) MEDIUM REPLACEMENT TYPE DISC APPARATUS

(75) Inventor: Toshiro Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/386,947

(22) Filed: Aug. 31, 1999

(30) Foreign Application Priority Data

Sep. 18, 1998 (JP) .......................................... 10-264185

(51) Int. Cl.[7] .............................................. G11B 5/596
(52) U.S. Cl. ............................... 360/73.03; 360/77.04; 360/78.05; 369/53.3; 369/47.38
(58) Field of Search .......................... 369/47.38, 47.41, 369/47.43, 47.45, 47.46, 53.3, 53.32, 53.35, 53.4, 53.43, 44.28; 360/73.03, 77.2, 77.04, 78.04, 78.05, 78.08, 78.09

(56) References Cited

U.S. PATENT DOCUMENTS

| 4,594,622 | A | * | 6/1986 | Wallis ...................... 360/77.04 |
| 5,276,569 | A | * | 1/1994 | Even ........................ 360/73.03 |
| 5,867,342 | A | * | 2/1999 | Hattori ..................... 360/77.04 |
| 5,923,491 | A | * | 7/1999 | Kisaka et al. ............. 360/77.04 |
| 6,011,668 | A | * | 1/2000 | Choi ........................ 360/78.06 |
| 6,067,206 | A | * | 5/2000 | Hull et al. ................ 360/77.02 |
| 6,166,875 | A | * | 12/2000 | Ueno et al. ............... 360/77.04 |
| 6,181,652 | B1 | * | 1/2001 | Katou et al. .............. 369/53.14 |
| 6,246,536 | B1 | * | 6/2001 | Galloway ................. 360/78.04 |

OTHER PUBLICATIONS

Sacks, A.H., et al., "Advanced Methods for Repeatable Runout Compensation,"IEEE Transaction on Magnetics, vol. 31, No. 2 (1995).

* cited by examiner

Primary Examiner—Thang V. Tran
(74) Attorney, Agent, or Firm—Foley & Lardner (57) ABSTRACT

The frequency rectification filter, in principle, measures an amplitude and phase of a particular frequency and compresses the frequency. Accordingly, if no initial value is present, it is necessary to take a time more than one turning cycle. Consequently, no effect can be seen immediately after the rise of an apparatus, and head positioning takes much time. The object of the present invention is to reduce this time. According to the present invention, a state amount of the frequency rectification filter is stored in memory before unloading the head from the disc, so that at apparatus rise, the spindle rotation angle is matched so as to operate the filter, thus increasing the speed of the rise of the effect of the frequency rectification filter. Thus, the risa of the frequency entire apparatus can be performed rapidly.

10 Claims, 6 Drawing Sheets

MEDIUM REPLACEMENT TYPE DISC APPARATUS

BACKGROUND OF THE INVENTION

1. Field of the Invention

The present invention relates to a medium replacement type disc apparatus and in particular, a medium replacement type disc apparatus such as floppy disc apparatus and an optical disc apparatus, 2. Description of the Related Art Conventionally, in a disc apparatus, a head is made to follow a predetermined track on a disc surface by a head positioning control system using a phase compensation filter such as a read lag filter or PID compensator. Here, if in a medium replacable disc apparatus, a disc medium is fixed on the spindle, there arise a primary rotation period runout (deviation) due to a chucking error. However, for a conventional disc apparatus, positioning using a stepping motor has been sufficient, not requiring a high-precision accuracy.

Moreover, in a large capacity floppy disc apparatus, a voice coil motor (VCM) is employed for fetching a position error information from a disc medium surface. In such a large capacity floppy disc, a sufficient control band is obtained by a closed system using a phase compensation filter, assuring a compression ratio for the runout low dimensional rotation synchronized component, according to a necessary head positioning accuracy. However, when a larger capacity is desired, the track pitch is made smaller, and accordingly, it becomes difficult to assure a compression ratio of the runout low dimension rotation synchronized component.

On the other hand, a frequency rectifying filter is used as a filter for compressing the rotation synchronized runout. This is an application of the inner principle wherein a sinusoidal model is placed in a closed loop to increase the gain of the rotation synchronized component, so as to improve compression ratio characteristic of the frequency of the rotation synchronized component. (Advanced Methods for Repeatable Runout Compensation, IEEE Transaction on Magnetics, Vol. 31, No. 2, March 1995).

In general, when measuring a runout amount of a predetermined frequency, this frequency rectification filter need to fetch an amplitude and phase data at least over one cycle. Moreover, in order to compress the runout rapidly, the frequency rectifying filter should have an increased gain. However, the gain increase is not preferable, there is a danger of lowing stability of the system. To cope with this, when the runout is greater than a predetermined value for the track pitch, a data of several cycles is required in order to fetch frequency rectification filter parameters. For example, in case of a disc apparatus of 3000 rpm, when compressing a primary rotation synchronized runout, it takes 20 msec for one disc turn. Actually, it takes a time much more than this for fetching the parameters, thus increasing the disc apparatus rise.

That is, when using the aforementioned frequency rectification filter, which in principle measures a an amplitude and phase of a particular frequency and compresses the frequency, if no initial parameter is present, a parameter fetch time of one cycle or more is required. Accordingly, immediately after the rise of an apparatus, it is impossible to obtain the runout compression filter and it takes time for head positioning. This problem becomes especially acute in a disc apparatus having a power save mode. In a disc apparatus, for power saving and disc and head wearing prevention, if no access is made to the disc for predetermined time, the head is unloaded from the disc surface and the spindle rotation is stopped. This is called power save mode. Especially in a disc apparatus for portable terminal, this mode is often set in, and reset from this mode should be performed rapidly.

SUMMARY OF THE INVENTION

It is therefore an object of the present invention to provide a medium replacement type disc apparatus employing a frequency rectification filter as a runout compression filter wherein upon disc rise, the frequency rectification filter can rise rapidly, and increasing the speed of rise of the entire apparatus.

The medium replacement type disc apparatus according to the present invention comprises: a spindle for rotating a disc; a head facing a track on the disc; a frequency rectification filter constituted by a sinusoidal wave model increasing a gain of a particular frequency component of a position error signal produced by the head; a phase compensation filter for generating a control input for the head to follow the track according to the output of the frequency rectification filter; a power amplifier for amplifying an output of the phase compensation filter; an actuator for moving the head with respect to the disc in its radial direction according to a drive signal amplified by the power amplifier; a main controller for performing drive control of the spindle and seek control of the head by the actuator according to an external access instruction; and a memory used for processing by this main controller, wherein the main controller has a rotation angle detection function for detecting a rotation angle of the spindle, and before reducing rotation speed of the spindle, stores in the memory the state amount of the frequency rectification filter together with the rotation angle of the spindle at that moment, and accelerates the spindle and, after the spindle speed has reached a predetermined constant speed, monitors the rotation angle of the spindle, and when the spindle rotation angle becomes equal to the rotation angle stored in the memory, sets in the frequency rectification filter the state amount of the frequency rectification filter stored in the memory.

According to another aspect of the present invention, there is provided a medium replacement type disc apparatus comprising: a spindle for rotating a disc; a head facing a track on the disc; a phase compensation filter causing the head to follow the track according to a position error signal produced by the head; a power amplifier for amplifying an output of this phase compensation filter; an actuator for moving the head in the radial direction of the disc according to the drive signal which has been amplified by this power amplifier; a main controller for performing drive control of the spindle and head seek control by the actuator according to an external access instruction; a memory used for processing by the main controller; a frequency rectification filter constituted by a sinusoidal wave model; and an adder for adding the output of the frequency rectification filter to the position error signal produced from the head and supplying a resultant sum to the phase compensation filter;

wherein the main controller stores in the memory in advance the amplitude and phase of a particular frequency component of the position error signal over one periphery of the disc, makes always 0 the input of the frequency rectification filter, calculates the state amount of the frequency rectification filter from the amplitude and phase stored in the memory, successively sets the state amounts in the frequency rectification filter according to the rotation of the disc, so as to obtain an output of the frequency rectification filter, and wherein the main controller, before reducing the rotation speed of the spindle, stores in the memory the state amount of the frequency rectification filter, accelerates the spindle, and after the speed has become constant, the main controller monitors the rotation angle of the spindle and when the rotation angle of the spindle is matched with the state amount stored in the memory, the state amount of the frequency rectification filter stored in the memory is set in the frequency rectification filter.

It is preferable that the main controller detect a rotation angle of the spindle according to the number of servo areas which have been passed by the head starting at the servo area serving as an index.

The motor for rotating the spindle may be a three-phase motor, and the main controller defines the index as a servo area passed by the head immediately after a predetermined phase of the three-phase motor is risen.

When the head is unloaded from a recording area of the disc, it is preferable that the main controller store in the memory a state amount of the frequency rectification filter and a rotation angle of the spindle.

It is preferable that a notch filter be provided between the phase compensation filter and the power amplifier, for reducing the resonance frequency gain.

DESCRIPTION OF THE PREFERRED EMBODIMENTS

Description will now be directed to an embodiment of the present invention with reference to FIG. 1 to FIG. 5.

Figure 1:
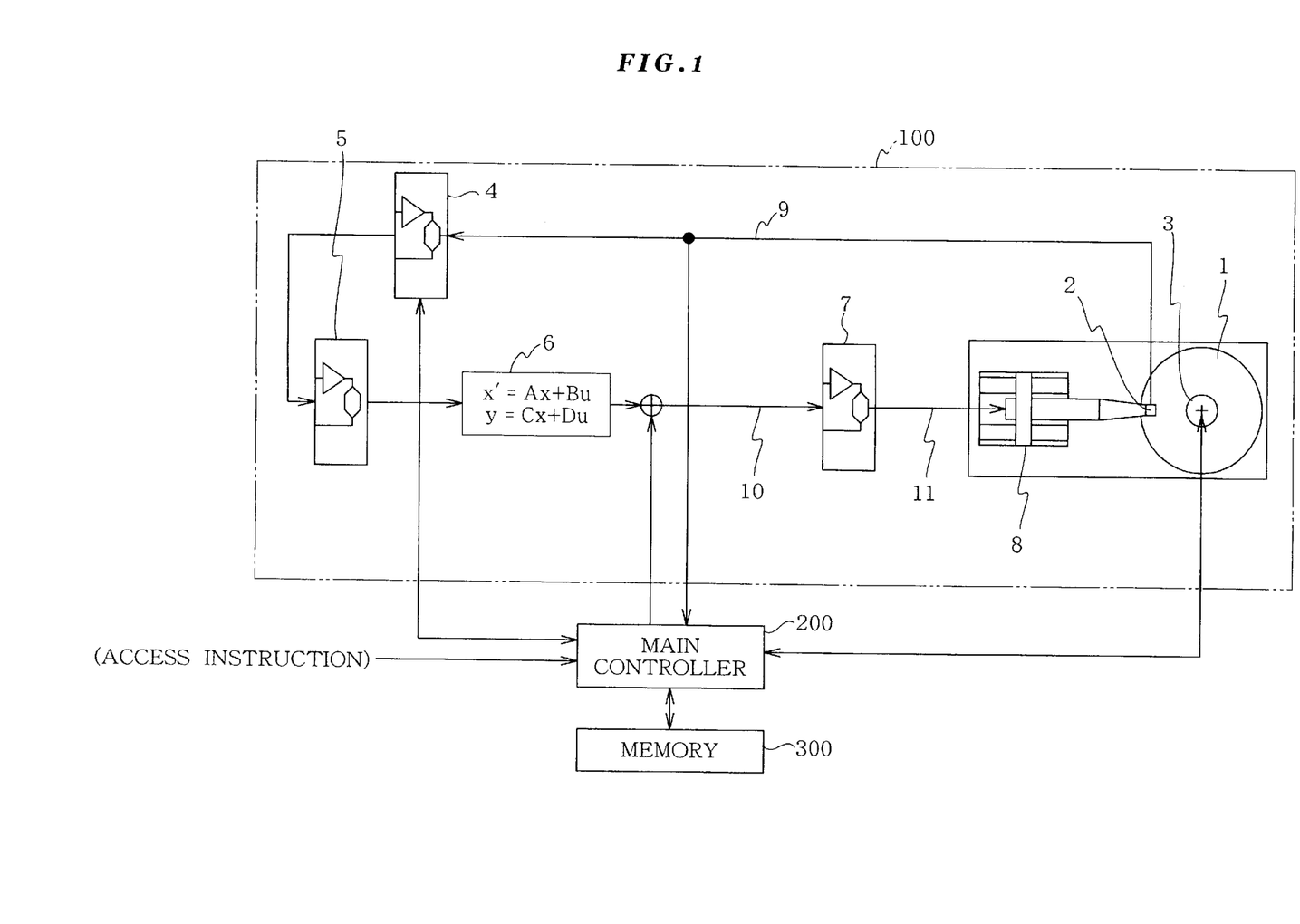
FIG. 1 is a block diagram showing a configuration according to an embodiment of the present invention.

FIG. 1 shows a medium replacement type disc apparatus including: a spindle 3 for rotating a disc 1; a head 2 facing the track on the disc 1; and a frequency rectification filter 4 for increasing a particular frequency component of a position error signal 9 consisting of a sinusoidal wave model and produced by the head 2. Moreover, the medium replacement type disc apparatus further includes: a phase compensation filter 5 for creating a control input for making the head 2 follow the track according to the output of the frequency rectification filter 4; a power amplifier 7 for amplifying the output of the phase compensation filter 5; and an actuator 8 for moving the position of the head 2 on the disc 1 in radial direction according to a drive current 11 which has been amplified by the power amplifier 7. Furthermore, the medium replacement type disc apparatus shown in FIG. 1 includes a main controller 200 for drive control of the spindle 3 according to an external access instruction and for performing seek control of the head; and a memory 300 used by the main controller 200 for performing processing.

Moreover, the main controller 200 has a rotation angle detection function for detecting a rotation angle of the spindle 3. Before decreasing the rotation speed of the spindle 3, the main controller stores a state amount of the frequency rectification filter 4 in the memory 300 together with the rotation angle of the spindle 3. Next, the spindle 3 is accelerated and when the speed has reached a predetermined speed, the rotation angle of the spindle 3 is monitored. When the rotation angle of the spindle 2 has become identical to the rotation angle stored in the memory 300, the state amount of the frequency rectification filter 4 stored in the memory 300 is re-set on the frequency rectification filter 4.

In this embodiment, the main controller 200 detects a rotation angle of the spindle 3 according to the radial servo areas 12 (in FIG. 2) starting at a servo area as an index provided on the disc 1, i.e., according to the count how many servo areas have been passed by the head 2.

Here, the servo area 12 serving as an index may be decided as follows. For example, if the spindle 3 is rotated by a three-phase motor (FIG. 3), and when the spindle 3 rotation speed has become constant, the main controller 200 decides a servo area 12 as an index passed by the head 2 immediately after one of the drive signals (FIG. 4) of the three-phase motor has risen.

Moreover, when unloading the head 2 from the recording area of the disc 1, the main controller 200 stores the state amount of the frequency rectification filter 4 and the rotation angle of the spindle 3 in the memory.

Moreover, a notch filter 6 is provided between the phase compensation filter 5 and the power amplifier 7, for decreasing a gain of resonance frequency.

Figure 2:
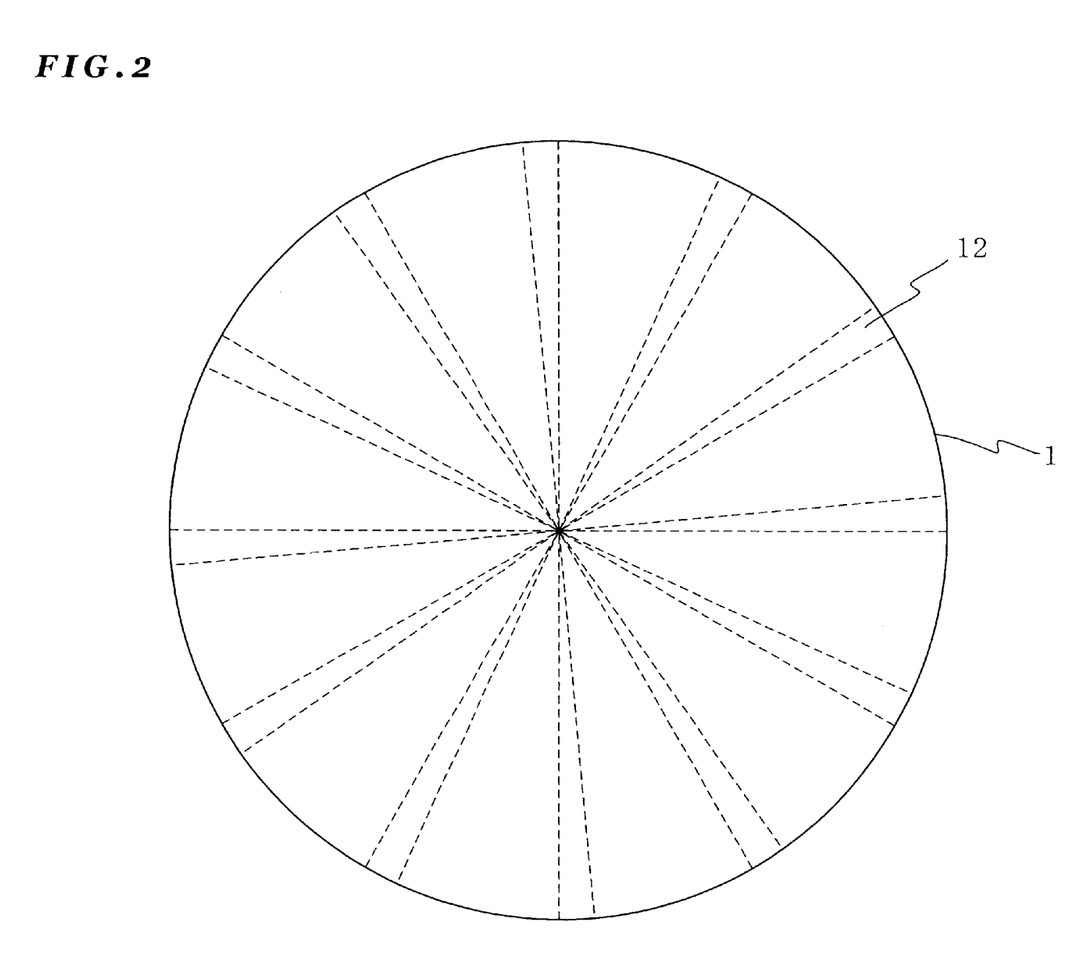
FIG. 2 shows servo areas provided on a disc medium.

This will be detailed below. In this embodiment, a servo information is written in the servo areas 12 as shown in FIG. 2. The head 2 reads out a servo signal, which enables to obtain a position error signal 9 indicating a relative positioning between the disc 1 and the head 2. In this embodiment, the position error signal 9 is realized by a sector servo method using a burst signal which is normally used in the magnetic disc apparatuses. However, it is also possible to use land-groove method generally used in the optical disc apparatuses, so that position error signals are discretely obtained. The position error signal 9 is supplied to the frequency rectification filter 4 and a particular frequency component gain is increased, before being supplied to the phase compensation filter 5. The phase compensation filter 5 assures stability of the entire control system. For example, a PID compensator or a read lag filter are employed. According to an output of the phase compensation filter, a control input 10 is created for the actuator. However, the aforementioned configuration cannot suppress an affect such as mechanical resonance having a higher frequency than the control bandwidth. Accordingly, the notch filter 6 is provided to decrease the resonance frequency gain before being sent to the power amplifier 7. in the power amplifier 7, an actuator control input 10 supplied through voltage is converted into a drive current 11 for operating the actuator so as to drive the actuator 8. Here, the frequency rectification can be expressed as the following equation of state.

[Equation 1]

$$X[k+1] = \begin{bmatrix} \cos(\omega T) & -\sin(\omega T) \\ \sin(\omega T) & \cos(\omega T) \end{bmatrix} X[k] + \begin{bmatrix} b_1 \\ b_2 \end{bmatrix} r[k] \quad (1)$$

$$y[k] = [c_1 c_2] X[k] + r[k] \quad (2)$$

wherein

ω: particular frequency (causing a runout);

T : sampling time (position error signal 9 is sampled at sampling time T and supplied to the frequency rectification filter 4);

r[k]: input to the frequency rectification filter 4 (position error signal);

X[k]: state amount of the frequency rectification filter 4;

y[k]: output of the frequency rectification filter 4;

k: sample number of the servo information from the index; and b1, b2, c1, c2: filter constant.

In this embodiment what is compressed is not only the primary rotation synchronization runout mainly caused by chucking error between the disc 1 and the spindle 3 but also a secondary rotation synchronization runout mainly caused by a thermal expansion when a flexible film disc medium is used. Here, in these frequency runouts, the runout phase due to the aforementioned main causes is almost identical in the radial direction.

Figure 3:
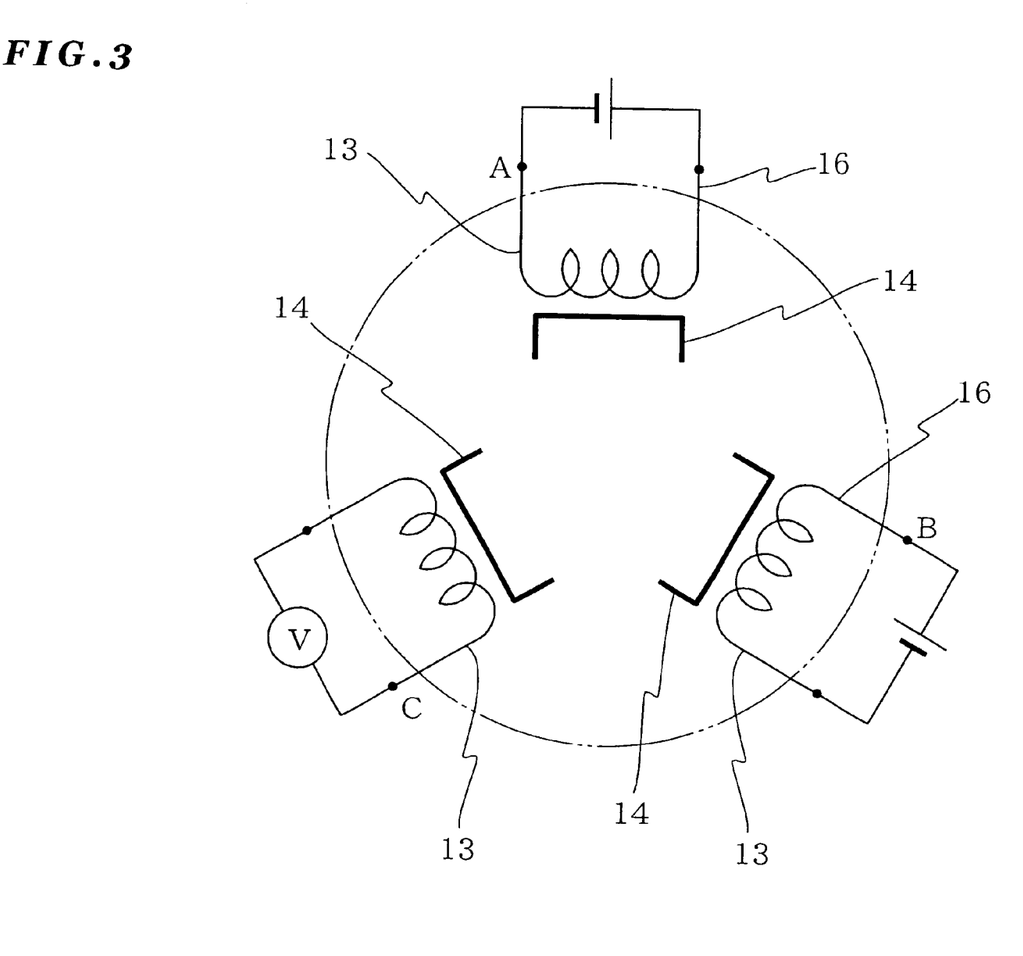
FIG. 3 shows a three-phase motor as the spindle motor.

The spindle 3 is driven by a three-phase motor. This three-phase motor has a configuration as shown in FIG. 3. In the spindle 3 using the three-phase motor, current 16 flows in two of the phases and generate a force to rotate the spindle. The remaining phase detects current (voltage) caused by intersecting magnetic flux.

Figure 4:
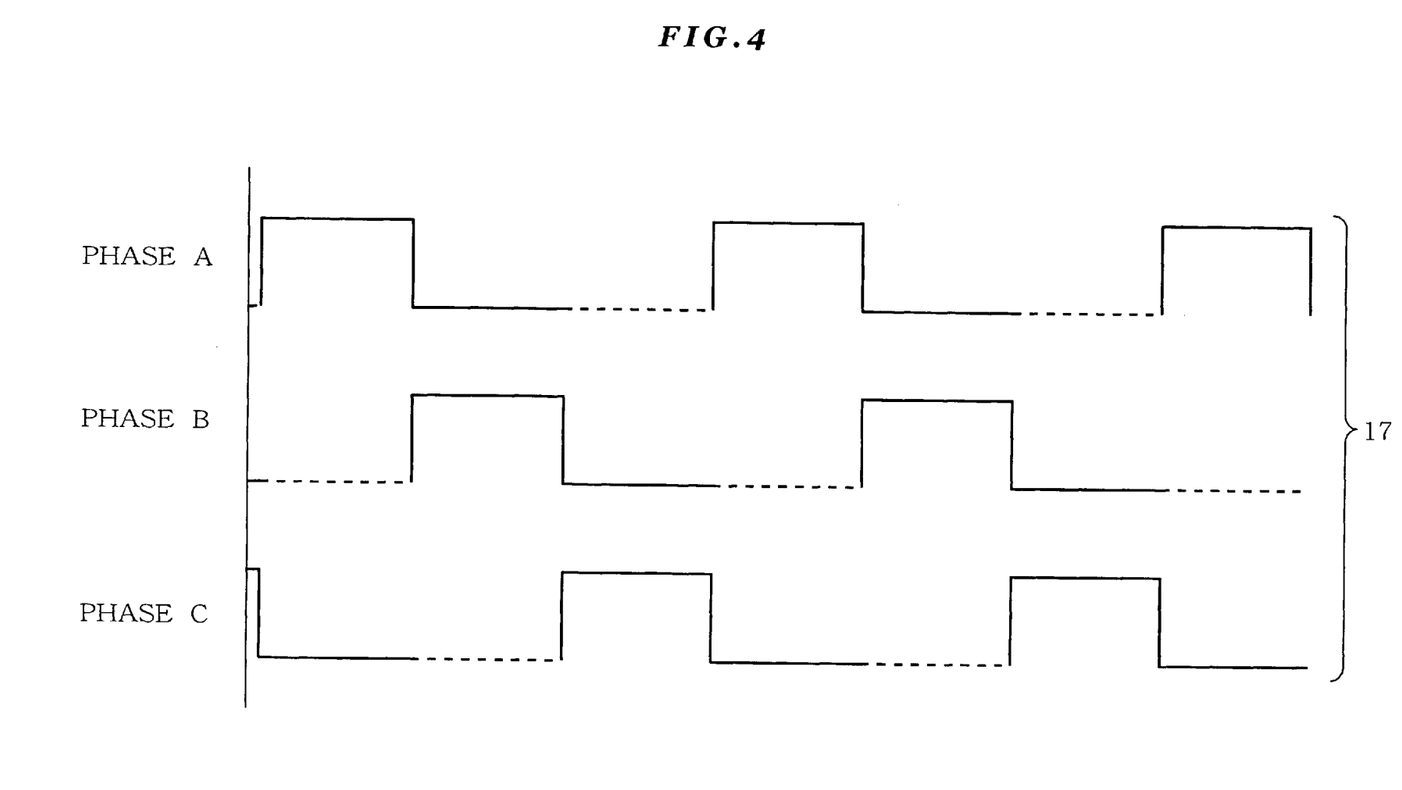
FIG. 4 shows signals of the drive current flowing through each of the coils in FIG. 3.

FIG. 4 shows the three-phase drive signals. The solid line indicates an interval when spindle drive current is flowing and a dotted line indicates an interval when the spindle rotation is detected. According to this spindle rotation detection, the main controller 200 detects the rotation speed of the spindle 3.

Moreover, the main controller has the spindle 3 rotation angle detection function which is realized as follows. If the index signal among the servo information in periphery is detected, the rotation angle of the spindle 3 and the disc 1 is can be determined by how many servo areas are passed by the head 2.

Here, the servo area serving as an index can be decided as follows. As has been described above, the main controller 200 detects a rotation speed of the spindle 3 and controls to rotate the spindle 3 at a constant speed according to the signal detected. Thus, the drive signal of the spindle 3 rises at a constant rotation position. The servo information item detected immediately after rise of one phase drive signal is used as an index, and it is possible to determine the rotation angle of the medium.

Figure 5:
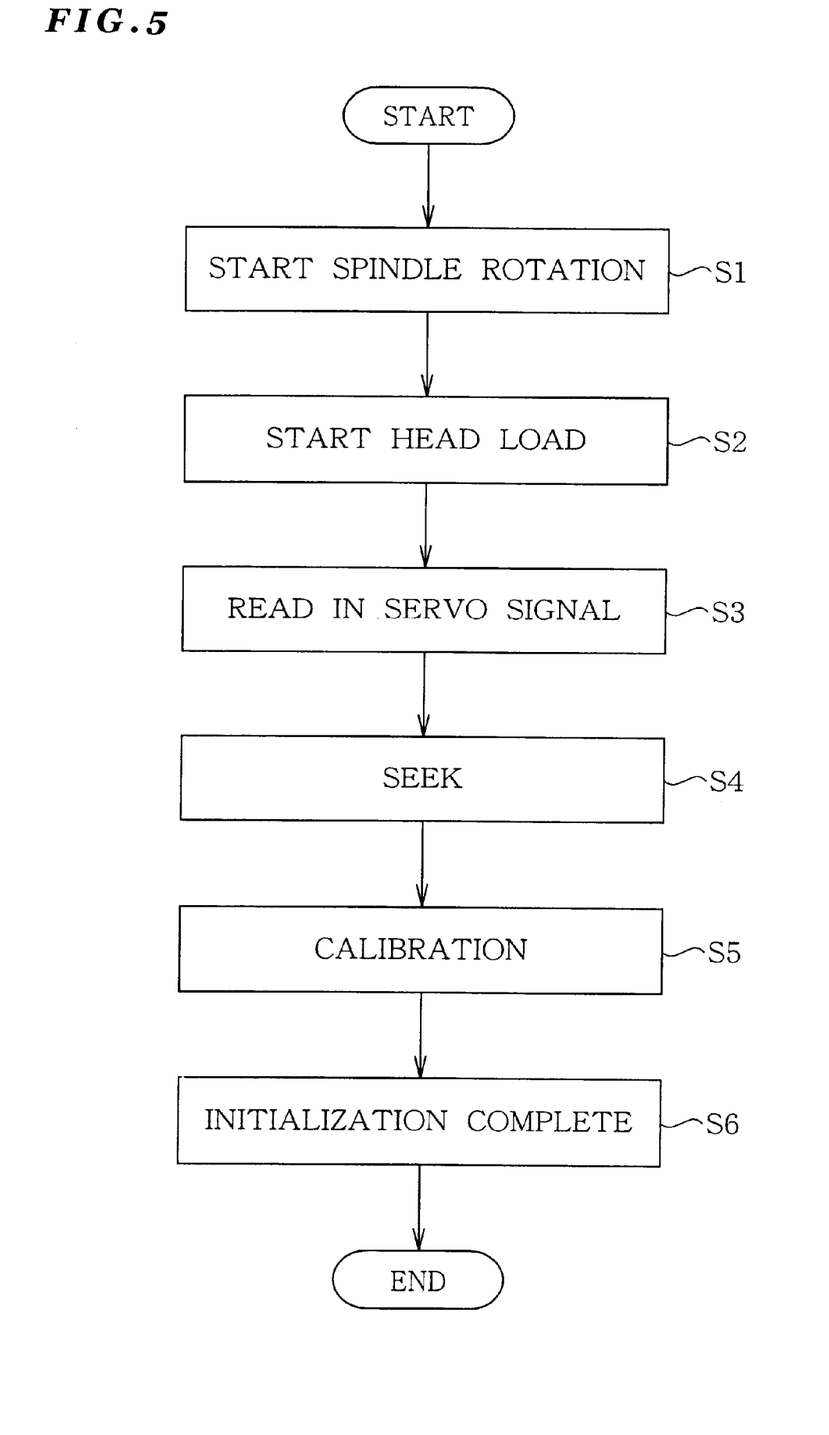
FIG. 5 is a flowchart showing operation of a main controller in FIG. 1.

Next, explanation will be given on the rise procedure of the present disc apparatus. FIG. 5 is a flowchart of the main controller 200.

When the apparatus is set to an operation state, the main controller 200 starts to rotate the spindle 3 (S1). The main controller 200 detects when the rotation speed has become stable and loads the head (S2). That is, the head which has been out of the recording area of the disc 1 is loaded onto the disc 1. Here, in order to increase the apparatus rise speed, the head 2 loading can be started upon detection of a predetermined speed of the spindle 3. After the head 2 is loaded, servo information items written on the disc 1 are read in (S3), and the head is made to seek (S4) a track containing an information required for a data access such as a file format information, and calibration is performed (S5). The calibration includes an output adjustment of the head 2, parameter adjustment of the follower controller 100 (enclosed portion in FIG. 1)

After this, if no access is made to the disc apparatus for a predetermined period of time, the main controller 200 unload the head 2 from the disc surface, stops rotation of the spindle 3, and enters a power save mode considering the power saving and prevention of wearing of the disc 1 and the head 2. Especially in a portable terminal disc apparatus, this mode is often used and it is necessary to increase the return speed from this mode.

However, when entering this mode and returning from this mode, rotation of the spindle 3 is reduced, stopped and accelerated. Accordingly, the spindle 3 comes out of synchronization with the frequency rectification filter 4. Therefore, when a normal mode is set in, the state amount of the frequency rectification filter 4 should be regenerated.

To cope with this, before unloading the head 2 and stopping the spindle 3 for entering the power save mode, the main controller 200 stores the state amount of the frequency rectification filter 4 as well as the rotation angle of the spindle at that moment. When the spindle 3 rotation speed has become constant in returning from the power save mode, the main controller 200 monitors the rotation angle of the spindle 3 and when the rotation angle becomes equal to the rotation angle stored in the memory 300, the main controller 200 resets the state amount in memory 300 for the frequency rectification filter 4. Thus, when the rotation angle detected has become same as that of the preceding operation end, the preceding state amount value is used, so that the state amount of the frequency rectification filter 4 can be matched rapidly.

Figure 6:
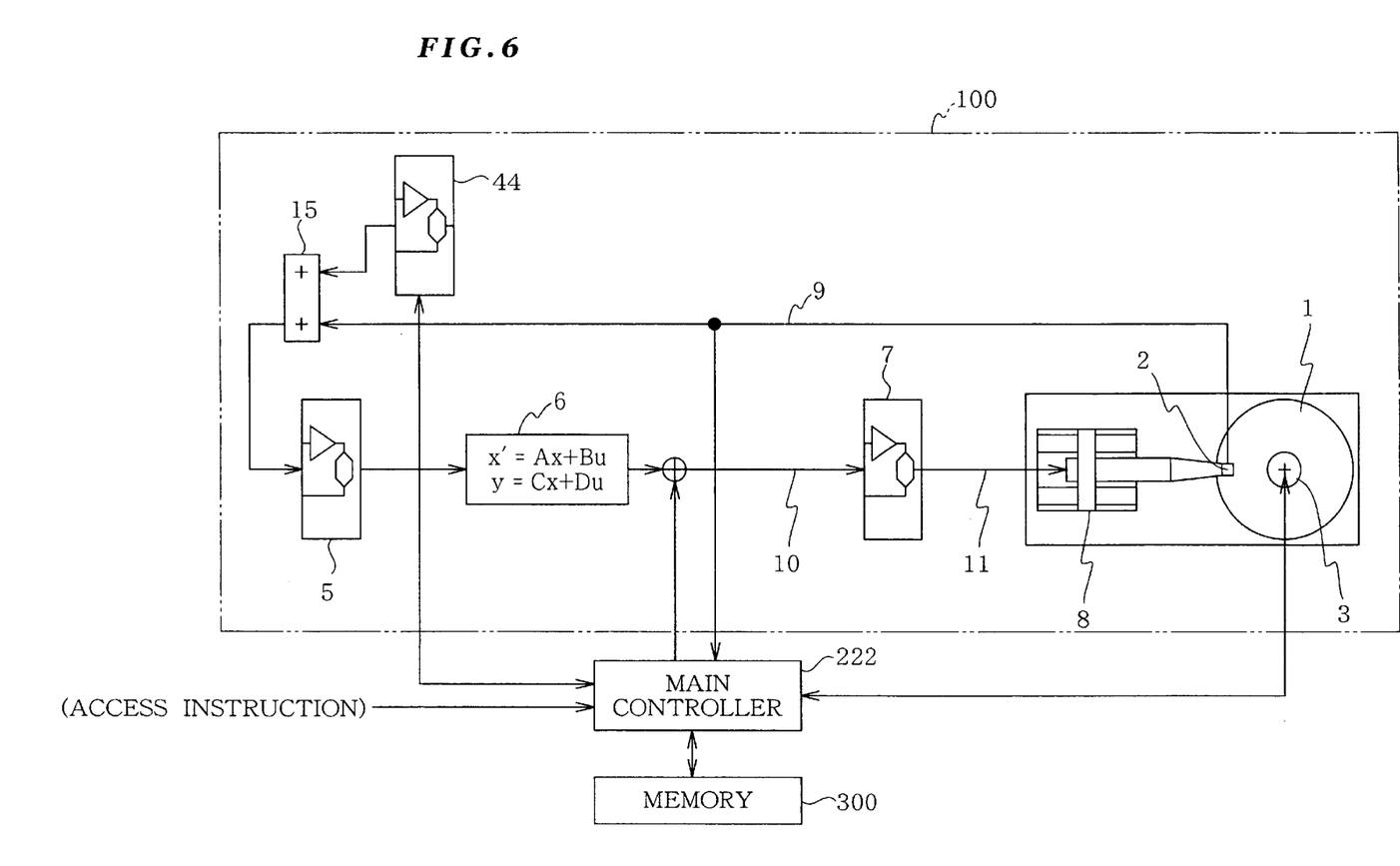
FIG. 6 is a block diagram showing another configuration according to another embodiment of the present invention.

Description will now be directed to another embodiment of the present invention with reference to FIG. 6.

FIG. 6 shows a medium replacement type disc apparatus including: a spindle 3 for rotation a disc 1; a head 2 facing the track on the disc 1; and a phase compensation filter 5 for making the head 2 follow the track according to a position error signal 9 produced by the head 2. Moreover, the medium replacement type disc apparatus further includes: a power amplifier 7 for amplifying the output of the phase compensation filter 5; and an actuator 8 for moving the head 2 in radial direction on the disc 1 according to a drive signal 11 amplified by the power amplifier 7. Furthermore, the medium replacement type disc apparatus includes: a main controller 222 for drive control of the spindle 3 according to an external access instruction and for seek control of the actuator 8; and a memory 300 used for processing of the main controller 222. Additionally, there are provided a frequency rectification filter 44 constituted by a sinusoidal wave model; an adder 15 for adding the output of the frequency rectification filter 44 to the position error signal 9 produced by the head 2 and supplying the result to the phase compensation filter 5.

The main controller 222 stores in the memory 300 in beforehand, amplitudes and a phases of a particular frequency component of the position error signal 9 for one periphery of the disc, and making the input of the frequency rectification filter 44 always 0, calculates state amounts of the frequency rectification filter 44 using the amplitudes and phases stored in the memory 300. The state amounts are successively set in the frequency rectification filter 44 according to the rotation of the disc 1, so as to obtain an output of the frequency rectification filter 44.

Moreover, before reducing the rotation speed of the spindle 3, the main controller 222 stores the state amount of the frequency rectification filter 44 in the memory 300, and accelerates the spindle 3. After the rotation of the spindle 3 has become constant, the rotation angle of the spindle 3 is monitored. When the rotation angle of the spindle 3 corresponds to the state amount stored in the memory 300, the state amount of the frequency rectification filter 4 stored in the memory 300 is set in the frequency rectification filter 4.

The other configuration is identical to the first embodiment.

In the second embodiment, as shown in FIG. 6, the frequency rectification filter 44 is isolated from the control system loop, and the position error signal 9 is supplied directly to the phase compensation filter 5. In this type, the input for the frequency rectification filter 44 is 0, i.e., equivalent r[k]=0 in the aforementioned equations. The state amount x can be expressed as follows.

[Equation 2]

$$\begin{cases} x_1[k] = C\cos(k\omega T + \phi) \\ x_2[k] = C\sin(k\omega T + \phi) \end{cases}$$

wherein
C: particular frequency runout amplitude
φ: particular frequency runout phase shift As is clear from this equation, in this type, operation is performed with 0 input to the frequency rectification filter 44 and the operation is equivalent to that only a particular frequency runout amplitude and phase are saved. The main controller 222, in this state, increments the sampling number for each sampling cycle, so that the frequency rectification filter 44 outputs a feed forward signal. In this case, according to the aforementioned equation, it is possible to obtain an amplitude and phase shift from the state amount of the frequency rectification filter 44.

However, in this feed forward type, for detecting an amplitude and a phase of a particular frequency, in the same way as the frequency rectification filter 4 of the first embodiment, it is necessary to insert it into a control loop for learning in advance.

Next, explanation will be given on the operation of the second embodiment.

The memory 300 contains the relationship between the phase and amplitude of a particular frequency component of the position error signal 9 recorded over one periphery of the disc 1. The main controller 222 successively reads out a phase and amplitude from the memory 300 corresponding to the rotation angle of the spindle 3 and successively substitutes them into Equation (3), successively calculates the state amount of the frequency rectification filter 44, and successively sets the obtained value in the frequency rectification filter 44. This enables the frequency rectification filter 44 to output a feed forward signal. When reducing the rotation speed of the spindle 3, the state amount of the frequency rectification filter 44 is identified; a phase and amplitude corresponding to the state amount are calculated; the calculation results are stored in the memory 300; and the speed of the spindle 3 is reduced so as to enter the power save mode or the like. After this, when the speed of the spindle 3 is accelerated and reset to the original speed, the rotation angle of the spindle 3 is monitored, and the phase and amplitude corresponding to the rotation angle are read out from the memory 300. Then, the state amount is calculated from Equation (3) and the resultant value is reset in the frequency rectification filter 44. This enables to rapidly perform the resetting of the state amount of the frequency rectification filter 44. Thus, resetting from the power save mode can be performed with a high speed.

Here, it is preferable that an initial state amount setting in the frequency rectification filter 44 be performed at a timing when the feed forward output is at its minimum. This enables operation without being accompanied by a large control output fluctuation.

Moreover, in the first and the second embodiments, the memory 300 may be a hard disc of the host apparatus to which the disc apparatus is connected. Moreover, the techniques of the first embodiment and the second embodiment are valid at a rise after the entire system power is turned off. If the medium has not been replaced during power off, upon system shut down, it is possible to store in a recording apparatus of fast rise such as a host hard disc apparatus, a data on the state amount of the frequency rectification filter and the rotation angle of the medium and when the data from the hard disc apparatus can be read, the data is read out to operate the frequency rectification filter.

According to the present invention having the aforementioned configuration, a state amount of the frequency rectification filter before speed reduction of the spindle is stored in the memory together with the spindle rotation angle at that time and when the spindle is reset to the original speed, the spindle rotation angle is monitored. When the rotation angle is matched with the rotation angle stored in the memory, the state amount stored in the memory is reset in the frequency rectification filter. This eliminates an empty rotation of the disc for setting the state amount of the frequency rectification filter and enables to rapidly set the state amount of the frequency rectification filter, which in turn enables to obtain a rapid rise of the disc apparatus.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-264185 (Filed on Sep. 18th, 1998) including specification, claims, drawings and summary are incorporated herein by reference in its entirety.

What is claimed is:
1. A medium replacement type disc apparatus comprising:
a spindle for rotating a disc;
a head facing a track on the disc;
a frequency rectification filter constituted by a sinusoidal wave model increasing a gain of a particular frequency component of a position error signal produced by the head;
a phase compensation filter for generating a control input for the head to follow the track according to the output of the frequency rectification filter;
a power amplifier for amplifying an output of the phase compensation filter;
an actuator for moving the head with respect to the disc in its radial direction according to a drive signal amplified by the power amplifier;
a main controller for performing drive control of the spindle and seek control of the head by the actuator according to an external access instruction; and
a memory used for processing by this main controller,
wherein the main controller has a rotation angle detection function for detecting a rotation angle of the spindle, and before reducing rotation speed of the spindle, stores in the memory the state amount of the frequency rectification filter together with the rotation angle of the spindle at that moment, and accelerates the spindle and, after the spindle speed has reached a predetermined constant speed, monitors the rotation angle of the spindle, and when the spindle rotation angle becomes equal to the rotation angle stored in the memory, sets in the frequency rectification filter the state amount of the frequency rectification filter stored in the memory.

2. A medium replacement type disc apparatus comprising:

a spindle for rotating a disc;

a head facing a track on the disc;

a phase compensation filter causing the head to follow the track according to a position error signal produced by the head;

a power amplifier for amplifying an output of this phase compensation filter;

an actuator for moving the head in the radial direction of the disc according to the drive signal which has been amplified by this power amplifier;

a main controller for performing drive control of the spindle and head seek control by the actuator according to an external access instruction;

a memory used for processing by the main controller;

a frequency rectification filter constituted by a sinusoidal wave model; and an adder for adding the output of the frequency rectification filter to the position error signal produced from the head and supplying a resultant sum to the phase compensation filter;

wherein the main controller stores in the memory in advance the amplitude and phase of a particular frequency component of the position error signal over one periphery of the disc, makes always 0 the input of the frequency rectification filter, calculates the state amount of the frequency rectification filter from the amplitude and phase stored in the memory, successively sets the state amounts in the frequency rectification filter according to the rotation of the disc, so as to obtain an output of the frequency rectification filter, and wherein the main controller, before reducing the rotation speed of the spindle, stores in the memory the state amount of the frequency rectification filter, accelerates the spindle, and after the speed has become constant, the main controller monitors the rotation angle of the spindle and when the rotation angle of the spindle is matched with the state amount stored in the memory, the state amount of the frequency rectification filter stored in the memory is set in the frequency rectification filter.

3. A medium replacement type disc apparatus as claimed in claim 1, wherein the main controller detects a rotation angle of the spindle according to the number of servo areas which have been passed by the head starting at the servo area serving as an index.

4. A medium replacement type disc apparatus as claimed in claim 2, wherein the main controller detects a rotation angle of the spindle according to the number of servo areas which have been passed by the head starting at the servo area serving as an index.

5. A medium replacement type disc apparatus as claimed in claim 3, wherein the motor for rotating the spindle is a three-phase motor, and the main controller defines the index as a servo area passed by the head immediately after a predetermined phase of the three-phase motor is risen.

6. A medium replacement type disc apparatus as claimed in claim 4, wherein the motor for rotating the spindle is a three-phase motor, and the main controller defines the index as a servo area passed by the head immediately after a predetermined phase of the three-phase motor is risen.

7. A medium replacement type disc apparatus as claimed in claim 1, wherein when the head is unloaded from a recording area of the disc, the main controller stores in the memory a state amount of the frequency rectification filter and a rotation angle of the spindle.

8. A medium replacement type disc apparatus as claimed in claim 2, wherein when the head is unloaded from a recording area of the disc, the main controller stores in the memory a state amount of the frequency rectification filter and a rotation angle of the spindle.

9. A medium replacement type disc apparatus as claimed in claim 1, wherein a notch filter is provided between the phase compensation filter and the power amplifier, for reducing the resonance frequency gain.

10. A medium replacement type disc apparatus as claimed in claim 2, wherein a notch filter is provided between the phase compensation filter and the power amplifier, for reducing the resonance frequency gain.

* * * * *